US012728640B2

(12) United States Patent
Tanaka et al.

(10) Patent No.: US 12,728,640 B2
(45) Date of Patent: Sep. 8, 2026

(54) LIQUID DISCHARGE SYSTEM

(71) Applicants: Tomoya Tanaka, Kanagawa (JP); Kento Aoki, Kanagawa (JP); Bingxian Chen, Kanagawa (JP); Shigeru Yoshida, Kanagawa (JP)

(72) Inventors: Tomoya Tanaka, Kanagawa (JP); Kento Aoki, Kanagawa (JP); Bingxian Chen, Kanagawa (JP); Shigeru Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 90 days.

(21) Appl. No.: 18/840,502

(22) PCT Filed: Mar. 1, 2023

(86) PCT No.: PCT/IB2023/051881
§ 371 (c)(1),
(2) Date: Aug. 22, 2024

(87) PCT Pub. No.: WO2023/180832
PCT Pub. Date: Sep. 28, 2023

(65) Prior Publication Data

US 2025/0178349 A1 Jun. 5, 2025

(30) Foreign Application Priority Data

Mar. 23, 2022 (JP) ................................ 2022-046306

(51) Int. Cl.
*B41J 2/165* (2006.01)
*B41J 2/175* (2006.01)
(Continued)

(52) U.S. Cl.
CPC ....... *B41J 2/16511* (2013.01); *B41J 2/16552* (2013.01); *B41J 2/17596* (2013.01);
(Continued)

(58) Field of Classification Search
CPC ....... B05B 13/0452; B05B 1/14; B05B 12/14; B41J 3/4073; B41J 2/16552; B41J 25/304; B25J 11/0075; B05C 5/027; B05D 1/02
See application file for complete search history.

(56) References Cited

U.S. PATENT DOCUMENTS 4,864,966 A * 9/1989 Anderson ........... B05B 13/0431 427/427.2
10,293,601 B2 * 5/2019 Baker .................. B41J 2/04586
(Continued)

FOREIGN PATENT DOCUMENTS

CN 101229726 A 7/2008
DE 10 2020 105 962 A1 9/2021
(Continued)

OTHER PUBLICATIONS

International Search Report and Written Opinion issued on May 30, 2023 in PCT/IB2023/051881 filed on Mar. 1, 2023, 9 pages.
(Continued)

*Primary Examiner* — John P Zimmermann
(74) *Attorney, Agent, or Firm* — XSENSUS LLP

(57) ABSTRACT

A liquid discharge system includes: a first head having a first nozzle, from which a liquid is to be discharged, on a first nozzle face oriented in a first direction; a second head having a second nozzle, from which a liquid is to be discharged, on a second nozzle face oriented in a second direction different from the first direction; a head holder holding the first head and the second head; a first sealer configured to contact and seal the first nozzle face; a second sealer configured to contact and seal the second nozzle face; a first cleaner configured to clean the first nozzle face in a state where the first sealer has contacted and sealed the first nozzle face; and a second cleaner configured to clean the second nozzle face
(Continued)

in a state where the second sealer has contacted and sealed the second nozzle face.

20 Claims, 10 Drawing Sheets

(51) Int. Cl.
*B41J 3/407* (2006.01)
*B41J 23/20* (2006.01)

(52) U.S. Cl.
CPC ............. *B41J 3/4073* (2013.01); *B41J 23/20* (2013.01); *B41J 2002/16555* (2013.01); *B41J 2202/05* (2013.01)

(56) References Cited

U.S. PATENT DOCUMENTS

| | | | | |
|---|---|---|---|---|
| 10,532,561 | B2 * | 1/2020 | Ingram | B41M 5/0017 |
| 11,203,030 | B2 * | 12/2021 | Fritz | B05B 12/04 |
| 11,504,735 | B2 * | 11/2022 | Fritz | B05B 15/555 |
| 2003/0077916 | A1 | 4/2003 | Xu et al. | |
| 2008/0225066 | A1 * | 9/2008 | Yorimoto | B41J 29/393 347/14 |
| 2010/0277523 | A1 | 11/2010 | Nishikawa | |
| 2011/0262622 | A1 * | 10/2011 | Herre | B05C 5/027 118/712 |
| 2012/0249679 | A1 | 10/2012 | Beier et al. | |
| 2013/0257984 | A1 * | 10/2013 | Beier | B05B 1/14 347/19 |
| 2014/0063096 | A1 * | 3/2014 | Pitz | B41J 11/002 347/9 |
| 2017/0203580 | A1 * | 7/2017 | Martins Pinto | B05B 3/00 |
| 2019/0077158 | A1 | 3/2019 | Tsubaki | |
| 2020/0247126 | A1 | 8/2020 | Kikuchi | |
| 2020/0331023 | A1 | 10/2020 | Chouan et al. | |
| 2025/0091058 | A1 * | 3/2025 | Truxton | B05B 1/169 |

FOREIGN PATENT DOCUMENTS

| | | | |
|---|---|---|---|
| JP | H09-109402 | A | 4/1997 |
| JP | 2012-144003 | A | 8/2012 |
| JP | 2012-187793 | A | 10/2012 |
| JP | 2018-171848 | A | 11/2018 |
| JP | 2019-048410 | A | 3/2019 |

OTHER PUBLICATIONS

Office Action issued May 26, 2026 in related Chinese Patent Application No. 202380026320.1.

* cited by examiner

LIQUID DISCHARGE SYSTEM

CROSS-REFERENCE TO RELATED APPLICATIONS

This patent application is based on and claims priority to PCT filing PCT/IB2023/051881, filed Mar. 1, 2023, which claims priority to Japanese Patent Application No. 2022-046306, filed on Mar. 23, 2022, in the Japan Patent Office, the entire disclosure of each of which is incorporated by reference herein.

TECHNICAL FIELD

The present embodiment relates to a liquid discharge system.

BACKGROUND ART

PTL 1 discloses a fluid jetting apparatus that efficiently performs a maintenance process of a fluid jetting head and a cap member by a configuration including a fluid spraying head having a nozzle forming surface on which a nozzle is formed, a cap member that is in close contact with the nozzle forming surface in a state of having a space in a region facing the nozzle, and a cleaning liquid spraying port that is arranged inside the space to spray a cleaning liquid toward the nozzle forming surface.

CITATION LIST

Patent Literature

[PTL 1]

Japanese Unexamined Patent Application Publication No. 2012-144003

SUMMARY OF INVENTION

Technical Problem

When a contact of a head corresponds to one direction, and a plurality of heads attached in different directions is not cleaned, there is a disadvantage of deterioration of productivity at the time of cleaning.

Solution to Problem

A liquid discharge system includes: a first head having a first nozzle, from which a liquid is to be discharged, on a first nozzle face oriented in a first direction; a second head having a second nozzle, from which a liquid is to be discharged, on a second nozzle face oriented in a second direction different from the first direction; a head holder holding the first head and the second head; a first sealer configured to contact and seal the first nozzle face; a second sealer configured to contact and seal the second nozzle face; a first cleaner configured to clean the first nozzle face in a state where the first sealer has contacted and sealed the first nozzle face; and a second cleaner configured to clean the second nozzle face in a state where the second sealer has contacted and sealed the second nozzle face.

Advantageous Effects of Invention

According to the present embodiment, it is possible to provide a liquid discharge system that improves productivity in cleaning of a plurality of heads in different directions.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
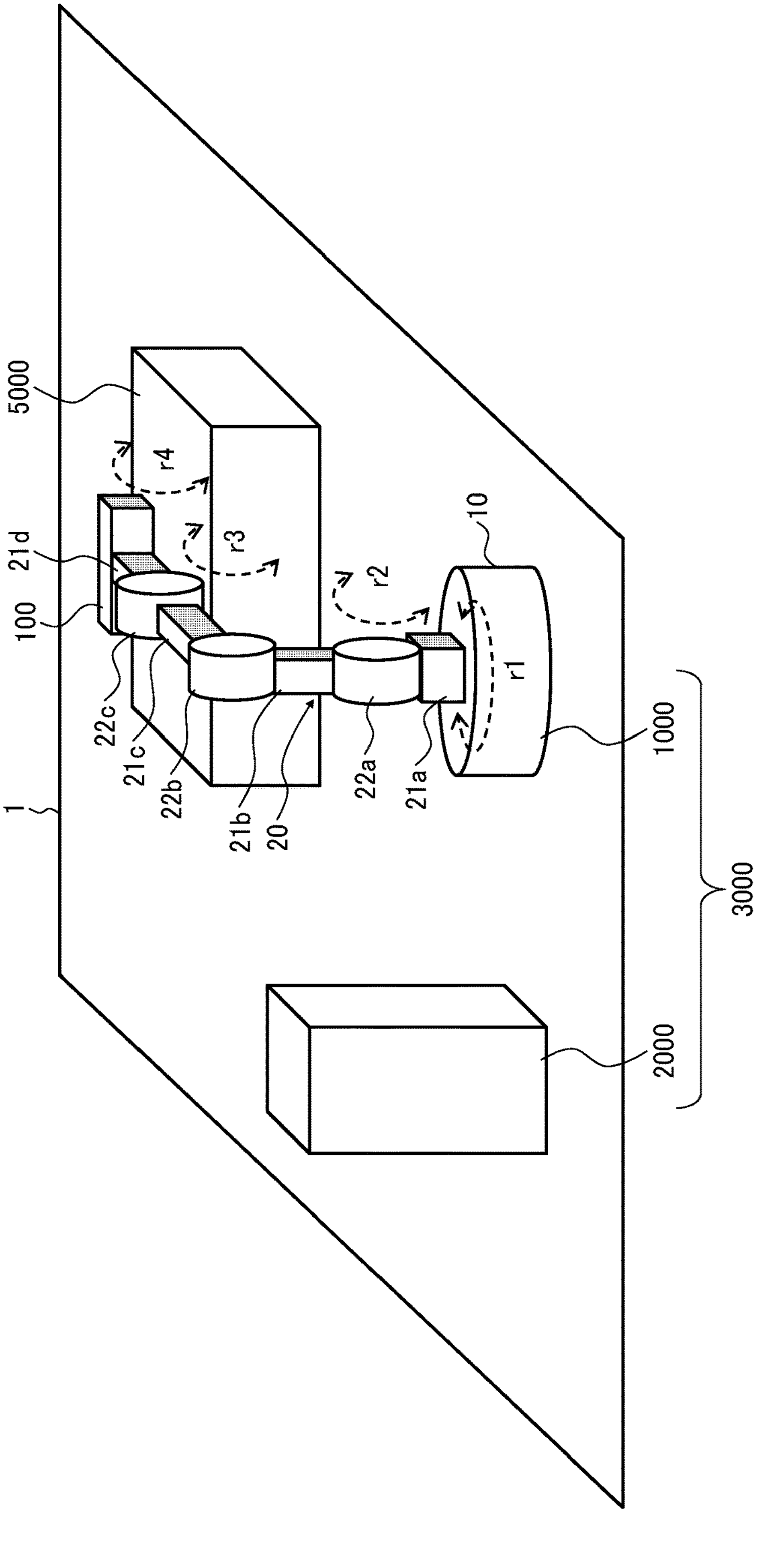
FIG. 1 is an overall schematic view of a liquid discharge system according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Outline of Liquid Discharge System

First, an outline of a liquid discharge system will be described with reference to FIG. 1. FIG. 1 is an overall schematic view of a liquid discharge system according to an embodiment of the present embodiment. The liquid discharge system exemplified herein is a coating system that coats the body or the like of an automobile.

Referring to FIG. 1, a coating system 3000 includes a coating robot 1000 and a cleaning station 2000, and the coating system 3000 is installed in a predetermined coating booth 1. The coating robot 1000 is an articulated robot, for example, and includes a head unit 100 at a distal end of a robot arm. The coating robot 1000 can freely move the head unit 100 with respect to an object 5000 such as a vehicle body, and can accurately arrange a head (described later) provided in the head unit 100 at a position where coating is to be applied to the object 5000.

For example, the coating robot 1000 includes a robot main body 10, an articulated arm device 20, and the head unit 100. The robot main body 10 is fixed to the floor surface of the coating booth 1 and supports the articulated arm device 20. The robot main body 10 also includes a robot controller 70 described later therein.

The articulated arm device 20 includes a first arm 21*a*, a second arm 21*b*, a third arm 21*c*, a fourth arm 21*d*, a first joint 22*a*, a second joint 22*b*, and a third joint 22*c*. One end of the first arm 21*a* is supported so as to be rotatable (turnable) in a direction of a dotted arrow r1 with respect to the robot main body 10, and the other end is connected to one end of the second arm 21*b* with the first joint 22*a* in between. One end of the second arm 21*b* is connected to the first arm 21*a* with the first joint 22*a* in between, so that the second arm is rotatable in a direction of a dotted arrow r2.

The other end of the second arm 21*b* is connected to one end of the third arm 21*c* with the second joint 22*b* in between. One end of the third arm 21*c* is connected to the second arm 21*b* with the second joint 22*b* in between, so that the third arm is rotatable in a direction of a dotted arrow r3. The other end of the third arm 21*c* is connected to one end of the fourth arm 21*d* with the third joint 22*c* in between. One end of the fourth arm 21*d* is connected to the third arm 21*c* with the third joint 22*c* in between, so that the fourth arm is rotatable in a direction of a dotted arrow r4. The head unit 100 is supported at the other end of the fourth arm 21*d*.

The rotation operations of the arms 21*a* to 21*d* are performed by controlling the drive motors provided in the joints 22*a* to 22*c* by the robot controller 70. This enables the head unit 100 to move vertically (up-and-down direction) and horizontally (side-to-side direction) relative to the object 5000.

The head arranged at the coating position discharges ink, which is an example of a liquid, toward the object 5000 to coat the object 5000. The cleaning station 2000 is installed in an area where the robot arm of the coating robot 1000 reaches, and the coating robot 1000 moves the head unit 100 to the cleaning station 2000 when ink discharge is completed or a predetermined time has elapsed. The cleaning station 2000 includes a cleaning apparatus for cleaning the head, and performs a cleaning process on the head provided in the head unit 100.

Configuration of Head

Figure 2:
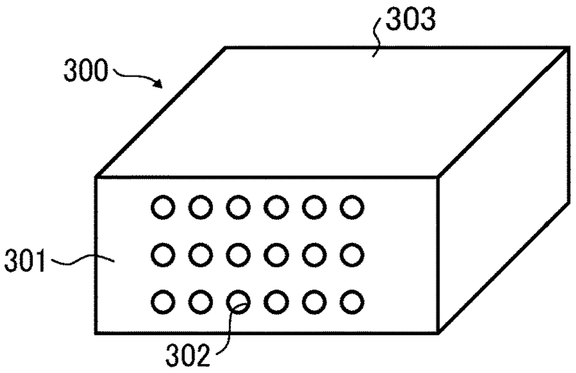
FIG. 2 is an overall perspective view of an example of a head.

Next, a schematic configuration of the head will be described with reference to FIG. 2. FIG. 2 is an overall perspective view of an example of the head.

Referring to FIG. 2, a head 300 is an inkjet-type head. The head 300 mainly includes a nozzle face 301, a nozzle 302, and a housing 303. The nozzle face 301 is provided on one surface of the housing 303 and includes nozzles 302 for discharging a liquid. The nozzles 302 are minute openings that can be opened and closed by a valve mechanism described later, and when the nozzles 302 are opened, a liquid is discharged from the nozzles 302. The housing 303 contains the valve mechanism that opens and closes the nozzles 302 and the like.

The nozzle face 301 including the nozzles 302 may be a separate member such as a nozzle plate, and the nozzle plate may be held in the housing 303. The number and arrangement of the nozzles 302 are not limited to the illustrated configuration. The number of the nozzle(s) 302 may be more than 18, or may not be plural but one. The nozzles 302 may be arranged not in a plurality of rows but in a single row.

Configuration of Valve Mechanism

Figure 3A:
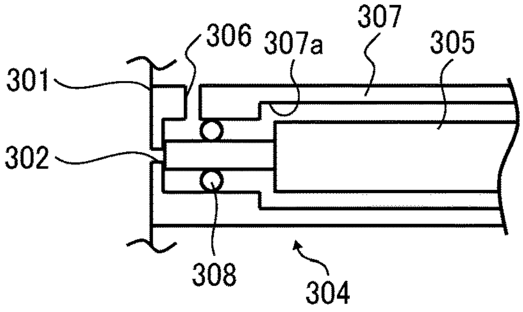
FIGS. 3A and 3B are operation explanatory diagrams illustrating an example of a valve mechanism.
Figure 3B:
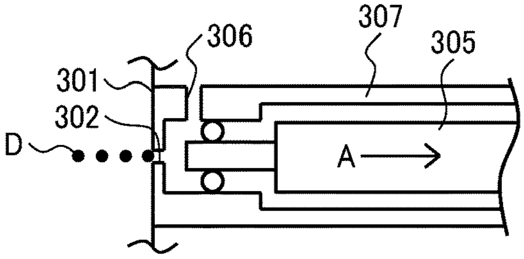

Next, a configuration of the valve mechanism will be described with reference to FIGS. 3A and 3B. FIGS. 3A and 3B are operation explanatory diagrams illustrating an example of a valve mechanism. FIG. 3A illustrates a state in which a nozzle is closed, and FIG. 3B illustrates a state in which the nozzle is opened.

The housing 303 of the head 300 illustrated in FIG. 2 contains a valve mechanism 304 as illustrated in FIG. 3. One valve mechanism 304 is provided for one nozzle 302.

The valve mechanism 304 includes a valve 305, a liquid supply port 306, a valve holder 307, and the like. The valve holder 307 has a space 307*a* with a hollow cross section, and includes the liquid supply port 306 in the vicinity of the nozzle 302. The liquid supply port 306 receives a liquid supplied in an externally pressurized state into the valve holder 307, and supplies the liquid to the rear portion of the nozzle face 301. The valve 305 is disposed in the space 307*a* provided in the valve holder 307, and is held by the valve holder 307 so as to be movable in the axial direction via a bearing 308.

In the above configuration, if the tip of the valve 305 is in close contact with the nozzle 302 as illustrated in FIG. 3A, the nozzle 302 is in a closed state, and thus the liquid supplied from the liquid supply port 306 is not discharged from the nozzle 302. When a voltage is applied to the valve 305, the valve 305 moves in the direction of arrow A as illustrated in FIG. 3B to open the nozzle 302. As a result, the liquid supply port 306 and the nozzle 302 communicate with each other to discharge the liquid as droplets D from the nozzle 302. The valve 305 opens and closes the nozzle 302 at a high speed with a frequency of several kHz, and can discharge liquid drop by drop.

Figure 4A:
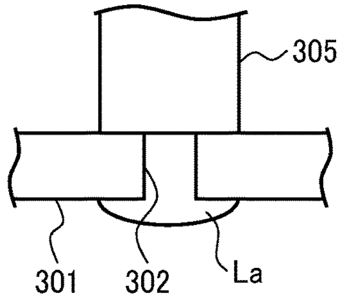
FIGS. 4A to 4C are explanatory diagrams illustrating states of nozzle contamination.
Figure 4B:
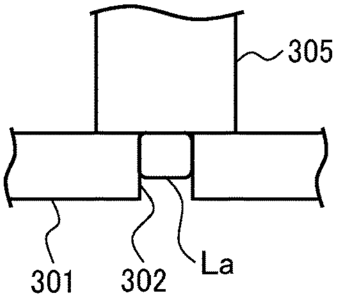
Figure 4C:
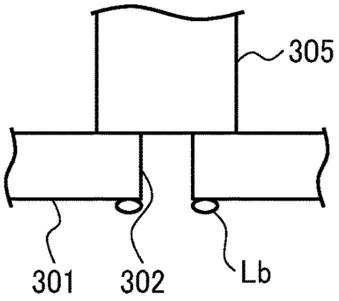

Herein, dirt on the nozzle portion of the head will be described with reference to FIGS. 4A to 4C. FIGS. 4A to 4C are explanatory diagrams illustrating states of nozzle contamination.

Upon completion of liquid discharge from the nozzle 302, a thickened liquid La may remain on the nozzle 302 and the nozzle face 301 as illustrated in FIG. 4A or 4B. In addition, a mist generated at the time of liquid discharge from the nozzle 302 may adhere to the periphery of the nozzle 302 of the nozzle face 301 and remain as an adhesion substance Lb as illustrated in FIG. 4C.

The thickened liquid La and the adhesion substance Lb may become resistance when the liquid is discharged from the nozzle 302, and cause discharge deflection of the liquid (the liquid may not be correctly discharged to a target position). In addition, if the liquid La is heavily thickened, discharge failure may occur (the liquid may not be discharged from the nozzle 302). Therefore, in order to maintain the discharge quality, it is desired to remove the thickened liquid La and the adhesion substance Lb.

Outline of Nozzle Cleaning

Figure 5A:
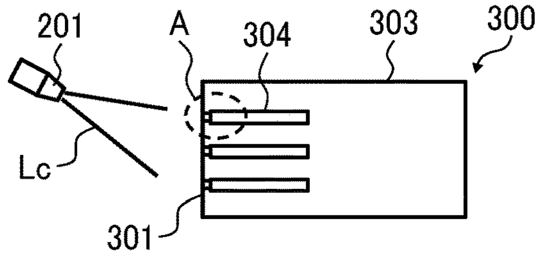
FIGS. 5A and 5B are schematic explanatory diagram of nozzle cleaning.
Figure 5B:
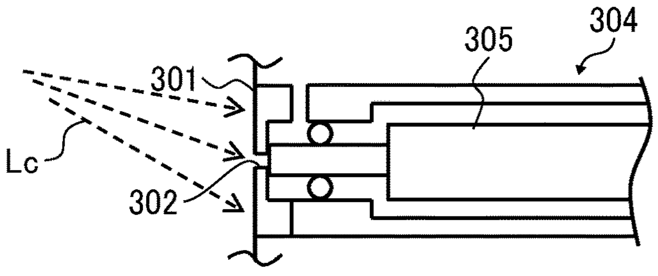

Next, an outline of nozzle cleaning will be described with reference to FIGS. 5A and 5B. FIGS. 5A and 5B are schematic explanatory views of nozzle cleaning, and FIG. 5A is a schematic configuration diagram of the head and a cleaner, and FIG. 5B is an enlarged view of a portion A in FIG. 5A.

As described above, the presence of the thickened liquid La or the adhesion substance Lb around the nozzle 302 causes discharge deflection or discharge failure. Therefore, in the present embodiment, the nozzle face 301 and the nozzle 302 are cleaned by blowing a pressurized cleaning liquid Lc onto the nozzle face 301 from a cleaning nozzle 201. At the time of cleaning the nozzle 302, the tip of the valve 305 is brought into close contact with the nozzle 302, and the cleaning liquid Lc is blown from the cleaning nozzle 201 in a state where the nozzle 302 is closed as illustrated in FIG. 5B. Thus, it is possible to wash away foreign matters such as the liquid La and the adhesion substance Lb adhering to the nozzle face 301 and the nozzle 302, and to maintain the discharge quality of the head 300.

Schematic Configuration of Cleaning Station

Figure 6:
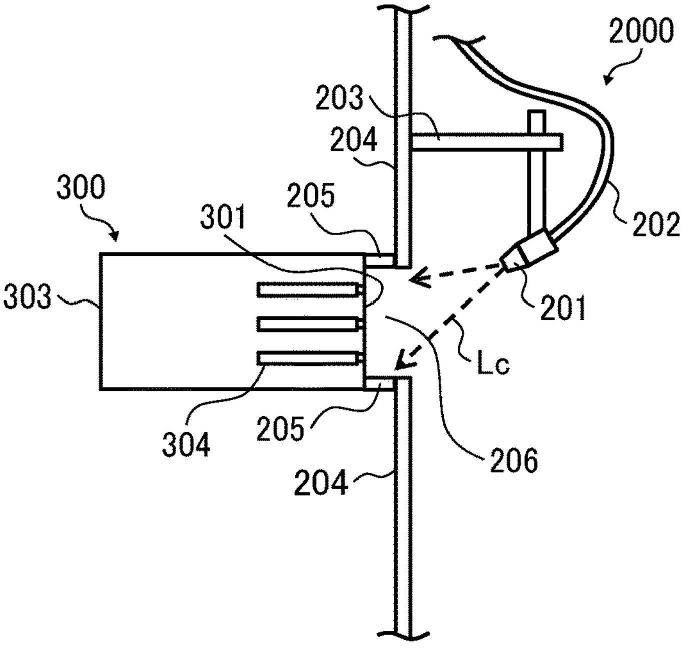
FIG. 6 is an explanatory diagram illustrating an example of a configuration of a cleaning station.

Next, a schematic configuration of the cleaning station will be described with reference to FIG. 6. FIG. 6 is an explanatory diagram illustrating an example of a configuration of the cleaning station.

The cleaning station 2000 is installed in the coating booth 1 as described above, and when the head unit 100 is moved to the cleaning station 2000 by the coating robot 1000, the cleaning station 2000 performs cleaning processing on the head 300. The cleaning station 2000 includes a cleaning nozzle 201, a tube 202 connected to the cleaning nozzle 201, a nozzle holder 203 holding the cleaning nozzle 201 at one end side, and a main body housing 204 holding the other end side of the nozzle holder 203.

An opening having an area smaller than the area of the nozzle face 301 of the head 300 is formed in a part of the main body housing 204, and a sealer 205 is provided around the opening (edge portion). When the cleaning process is performed on the head 300, the nozzle face 301 is pressed against the sealer 205 to form a space (hereinafter, a sealing portion) 206 in close contact between the head 300 and the cleaning station 2000.

In the above configuration, when the cleaning process is performed on the head 300, the tip of the valve 305 is brought into close contact with the nozzle 302 to close the nozzle 302, and the sealing portion 206 is formed between the head 300 and the cleaning station 2000. In this state, the pressurized cleaning liquid Lc is sent to the cleaning nozzle 201 by the tube 202, and the cleaning nozzle 201 sprays the cleaning liquid Lc toward the nozzle face 301.

When the cleaning liquid Lc is sprayed onto the nozzle face 301, if the sealer 205 and the nozzle face 301 are not in close contact with each other, the cleaning liquid Lc or the like scatters from the gap between the nozzle face 301 and the sealer 205 to the outside of the cleaning station 2000. The cleaning liquid Lc or the like scattered outside the cleaning station 2000 contaminates the coating booth 1 or falls on the object 5000, which leads to deterioration in quality of the object 5000. In addition, if the cleaning liquid Lc falls on the electrical components of the head 300 and the coating robot 1000, the head 300 and the coating robot 1000 may fail to operate properly. Therefore, it is desired to reliably bring the nozzle face 301 and the sealer 205 into close contact with each other during the cleaning process.

Configuration of Head Unit

Figure 7:
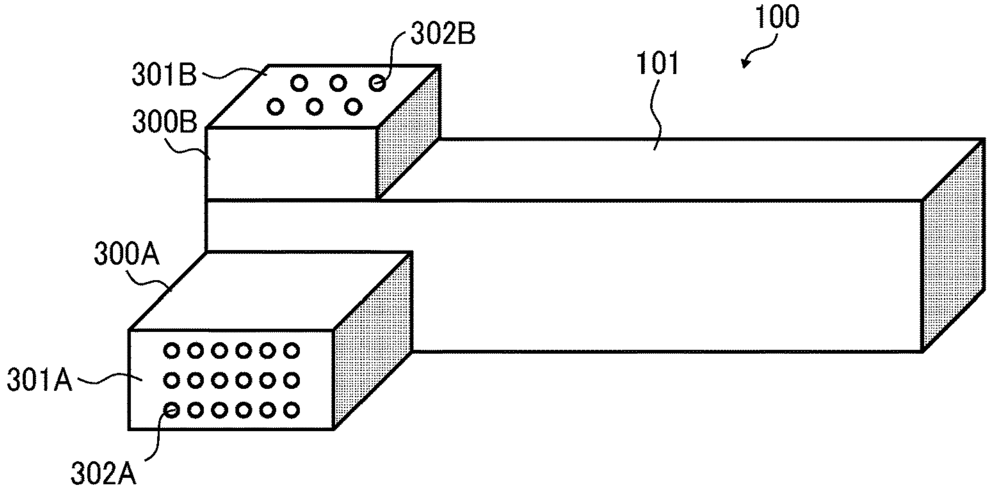
FIG. 7 is an overall perspective view of an example of a head unit.

Next, a schematic configuration of the head unit will be described with reference to FIG. 7. FIG. 7 is an overall perspective view of an example of the head unit.

The forms of objects to be painted or printed using an inkjet-type head are not limited to flat media such as paper, a plate, and cloth. The forms of objects such as a vehicle body of an automobile and a wall of a building are diversified, and liquid discharge into complicated shapes is needed.

In the present embodiment, in order to cope with liquid discharge into complicated shapes, the head unit 100 includes a plurality of heads 300A and 300B so that they can be used properly according to the shape of an object. The first head 300A and the second head 300B are provided on the head holder 101 with nozzle faces 301A and 301B oriented in different directions. In the present embodiment, the first nozzle face 301A and the second nozzle face 301B are shifted by 90 degrees.

The head unit 100 having the above configuration is attached to the coating robot 1000, and the head unit 100 is moved while the heads 300A and 300B are selectively used with respect to the object 5000, so that coating into a complicated shape can be performed. In the heads 300A and 300B, the numbers, arrangement, and the like of nozzles 302A and 302B are not limited to the illustrated ones. The first head 300A is an example of a "first head", and the second head 300B is an example of a "second head". The first nozzle face 301A of the first head 300A is an example of a "first nozzle face", and the second nozzle face 301B of the second head 300B is an example of a "second nozzle face".

Hardware Configuration

Figure 11:
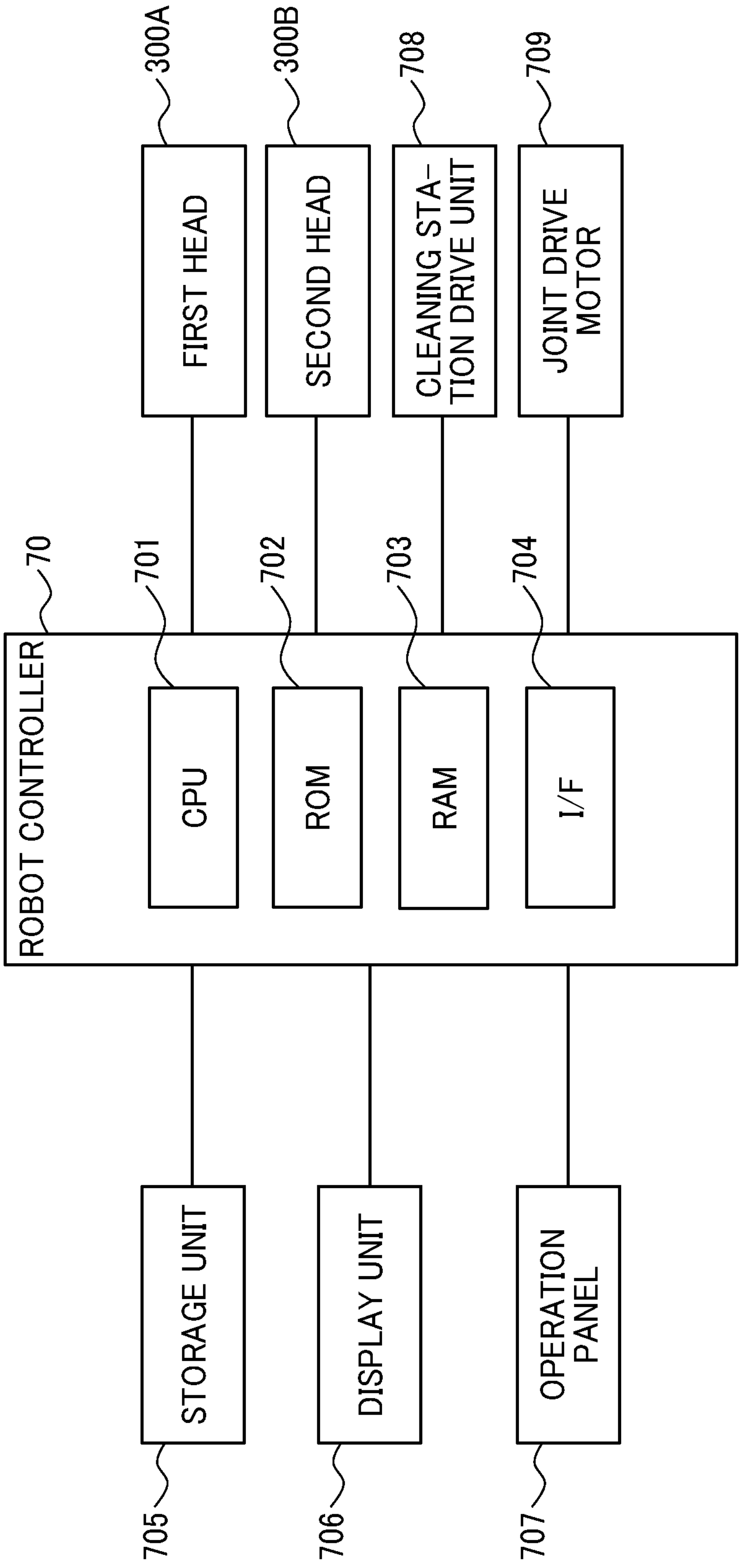
FIG. 11 is a block diagram illustrating an example of a schematic configuration of hardware of a coating robot.

Next, a schematic configuration of hardware of the coating robot according to the embodiment will be described with reference to FIG. 11. In the hardware configuration illustrated in FIG. 11, components may be added or deleted as desired. FIG. 11 is a block diagram illustrating an example of a schematic configuration of hardware of the coating robot 1000.

The coating robot 1000 includes a robot controller 70 inside the robot main body 10. The robot controller 70 may be provided outside the robot main body 10, or may be provided as a device separate from the coating robot 1000.

The robot controller 70 includes a central processing unit (CPU) 701, a read only memory (ROM) 702, a random access memory (RAM) 703, and an interface (I/F) 704.

The CPU 701 controls the entire coating robot 1000. The CPU 701 is an arithmetic device that implements each function of the coating robot 1000 by reading a program or data stored in the ROM 702, the storage unit 705, or the like onto the RAM 703 and executing processing.

The ROM 702 is a non-volatile memory that holds programs or data even if the power is turned off. The RAM 703 is a volatile memory used as a work area or the like of the CPU 701. The I/F 704 is an interface for inputting and outputting characters, numerical values, various instructions, and the like to and from various external devices and the like. The I/F 704 controls display of various types of information such as a cursor, a menu, a window, characters, or images on a display unit 706 such as a liquid crystal display (LCD). The storage unit 705 stores various data such as programs.

The display unit 706 displays various types of information such as a cursor, a menu, a window, characters, or images. The operation panel 707 is a type of input unit for inputting characters, numerical values, various instructions, or the like, selecting or executing various instructions, selecting a processing target, moving the cursor, or the like.

Furthermore, the first head 300A, the second head 300B, a cleaning station drive unit 708, a joint drive motor 709, and the like are connected to the robot controller 70. The first head 300A and the second head 300B execute a liquid discharge operation on the object 5000 in response to a command from the CPU 701. When cleaning the first nozzle face 301A of the first head 300A, the cleaning station drive unit 708 executes movement of the first head 300A with respect to the first sealer 205A of the cleaning station 2000 based on a command from the CPU 701. The joint drive motor 709 drives the joints 22*a* to 22*c* of the articulated arm device 20 of the coating robot 1000 in response to a command from the CPU 701, and executes the rotation operation of the arms 21*a* to 21*d*. The cleaning station drive unit 708 may also be referred to as a "driver."

If the nozzle faces of the plurality of heads is oriented in different directions as in the head unit 100, the sealing portion 206 may not be simultaneously formed with respect to the plurality of nozzle faces 301A and 301B in the configuration illustrated in FIG. 6 alone. Therefore, in the configuration illustrated in FIG. 6, for example, it is desired to perform contacting, sealing, and cleaning on the second head 300B after performing contacting, sealing, and cleaning on the first head 300A, which causes a problem that it takes time to perform the cleaning process of the heads. In the present embodiment, the cleaning process can be simultaneously performed on the nozzle faces oriented in different directions, and the details thereof will be described below.

Operation of Embodiment

Figure 8A:
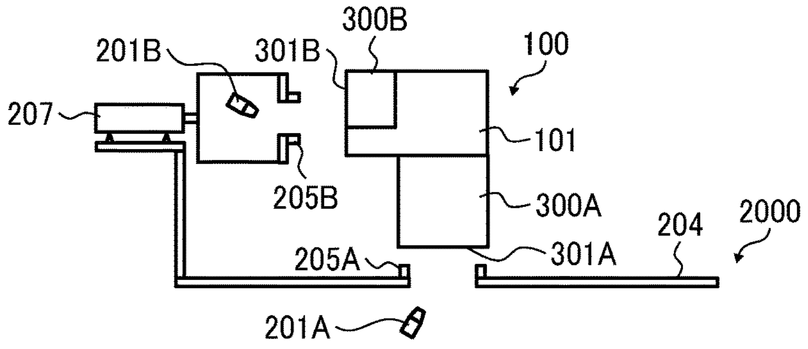
FIGS. 8A to 8C are explanatory diagrams illustrating an example of an operation of forming a sealing portion.
Figure 8B:
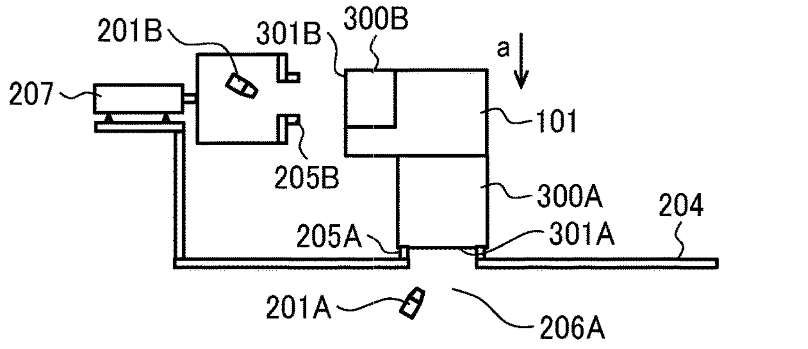
Figure 8C:
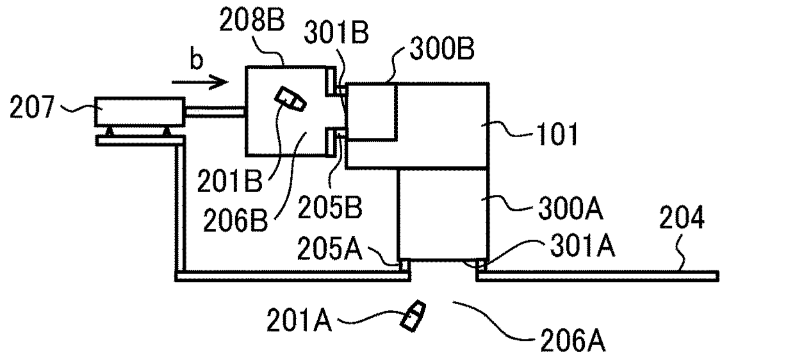

An operation of forming the sealing portion with respect to two heads provided in the head unit will be described with reference to FIGS. 8A to 8C. FIGS. 8A to 8C are explanatory diagrams illustrating an example of an operation of forming a sealing portion.

In the present embodiment, the sealing portion is formed for the two heads 300A and 300B in which the first nozzle face 301A and the second nozzle face 301B are oriented in different directions, thereby to enable simultaneous cleaning of the first nozzle face 301A and the second nozzle face 301B. This improves productivity of the cleaning process.

In FIG. 8, the head unit 100 is attached to the distal end of the robot arm of the coating robot 1000. As illustrated in FIG. 8A, the main body housing 204 of the cleaning station 2000 includes the first sealer 205A for contacting and sealing the first nozzle face 301A of the first head 300A. Furthermore, the main body housing 204 includes a power cylinder 207 for moving a second sealer 205B forward and backward (moving in the side-to-side direction in the drawing) with respect to the second nozzle face 301B of the second head 300B. The state illustrated in FIG. 8A is a state in which neither the first head 300A nor the second head 300B is in the close contact state.

From this state, first, as illustrated in FIG. 8B, the first head 300A is moved toward the first sealer 205A (direction of arrow a), and the first nozzle face 301A is pressed against the first sealer 205A. As a result, a first sealing portion 206A is formed between the first head 300A and the cleaning station 2000.

The cleaning nozzle 201A is arranged so as to be spraying the cleaning liquid to the first nozzle face 301A with the first sealing portion 206A formed. The first head 300A is moved toward the first sealer 205A by the coating robot 1000. The first nozzle face 301A is pressed against the first sealer 205A using the force of the coating robot 1000 holding the head unit 100. The state illustrated in FIG. 8B is a state in which the first head 300A is in close contact and the second head 300B is not in close contact.

When the first head 300A is brought into close contact, the coating robot 1000 terminates the operation in a state where the first head 300A is in close contact, and stops on the spot. Next, air is input to the power cylinder 207 in a direction in which to push out the cylinder, and as illustrated in FIG. 8C, the cylinder moves the second sealer 205B toward the second head 300B (direction of arrow b) to press the second sealer 205B against the second nozzle face 301B. As a result, a second sealing portion 206B is formed between the second head 300B and the cleaning station 2000.

In the present embodiment, the second sealing portion 206B is formed by bringing the second nozzle face 301B and a cleaning nozzle holder 208B attached to the power cylinder 207 into close contact with each other by the second sealer 205B. The cleaning nozzle 201B is arranged in the cleaning nozzle holder 208B so that the cleaning liquid can be sprayed to the second nozzle face 301B in a state where the second sealing portion 206B is formed.

The first sealing portion 206A is an example of a "first sealing portion", and the first sealer 205A is an example of a "first sealer". The second sealing portion 206B is an example of a "second sealing portion", and the second sealer 205B is an example of a "second sealer". The cleaning nozzle 201A is an example of a "first cleaner", and the cleaning nozzle 201B is an example of a "second cleaner". The coating robot 1000 is an example of a "first moving unit", and the power cylinder 207 is an example of a "second moving unit".

As described above, pressing the first nozzle face 301A and the first sealer 205A by driving the coating robot 1000 and pressing the second nozzle face 301B and the second sealer 205B by driving the power cylinder 207 makes it possible to simultaneously form the sealing portions 206A and 206B with respect to the nozzle faces 301A and 301B oriented in different directions. As a result, the cleaning liquid can be simultaneously sprayed from the cleaning nozzles 201A and 201B installed in the sealing portions 206A and 206B, and the productivity of the cleaning process can be improved.

When the cleaning of the heads 300A and 300B is completed, the heads 300A and 300B are released from the close contact by a procedure reverse to the procedure at the time of forming the sealing portion. In the power cylinder 207, the input of the air in the direction in which the cylinder is pushed out is ended, and the air is input in the direction in which the cylinder is drawn to release the second head 300B from the close contact. After the second head 300B is released from the close contact, the coating robot 1000 moves in the direction opposite to the arrow a in FIG. 8B, and the first head 300A is released from the close contact.

As described above, the present embodiment includes: the first nozzle face 301A on which the first nozzle 302A that discharges a liquid is formed; the first head 300A having the first nozzle face 301A; the second nozzle face 301B on which the second nozzle 302B discharging a liquid is formed and which is oriented in a direction different from the first nozzle face 301A; the second head 300B having the second nozzle face 301B; the head holder 101 including the first head 300A and the second head 300B; the first sealer 205A that forms the first sealing portion 206A with respect to the first nozzle face 301A; the second sealer 205B that forms the second sealing portion 206B with respect to the second nozzle face 301B; the cleaning nozzle 201A that cleans the first nozzle face 301A with the first sealing portion 206A formed; and the cleaning nozzle 201B that cleans the second nozzle face 301B with the second sealing portion 206B formed.

Thus, it is possible to provide a liquid discharge system that improves productivity in cleaning of the plurality of heads 300A and 300B oriented in different directions. For example, the liquid discharge system may have a configuration in which two coating robots are prepared, and the object 5000 is coated using a coating robot having a robot arm including the first head 300A and a coating robot having a robot arm including the second head 300B. In that case, however, the positional accuracy with respect to the object 5000 may deteriorate due to an accuracy error unique to the coating robots or the like. As the number of coating robots increases, the production cost increases, and the portable weight also increases, so that the installation cost and the like of the coating robots may also increase. The configuration in which one robot arm includes a plurality of heads as in the present embodiment is also advantageous for these problems.

As described above, separately providing the moving units for creating a close contact state with respect to the nozzle faces oriented in different directions, productivity of the cleaning process can be improved. In the present embodiment, the power cylinder 207 is used as a drive source of the moving unit that presses the second nozzle face 301B and the second sealer 205B, but the drive source is not limited to the power cylinder 207. For example, the second sealer 205B may be moved toward the second nozzle face 301B by motor driving. However, if the ink, coating material, or cleaning liquid is a liquid containing a solvent, and the coating booth 1 is designated as an explosion-proof area, the use of an electric device may conflict with the explosion-proof standard. Therefore, it is considered to be advantageous from the viewpoint of explosion prevention to adopt an air cylinder using air among power cylinders as the drive source.

In the present embodiment, the coating robot 1000 is used as a drive source of the moving unit that presses the first nozzle face 301A and the first sealer 205A, but the drive source is not limited to the coating robot 1000. In order to simultaneously clean the nozzle faces 301A and 301B oriented in different orientations, it is sufficient to provide separate drive sources for the respective heads, so that the two heads may also use power cylinders. However, if the drive sources are both power cylinders, it is desired to provide two attachment portions of the power cylinders in the cleaning station 2000. Therefore, it is advantageous to use the coating robot 1000 as one drive source in order to simplify the configuration of the cleaning station 2000 as described above, and it is possible to realize space saving and cost reduction of the cleaning station 2000.

As described above, the present embodiment includes the coating robot 1000 that relatively moves the first nozzle face 301A and the first sealer 205A, and the power cylinder 207 that relatively moves the second nozzle face 301B and the second sealer 205B.

As described above, the coating robot 1000 and the power cylinder 207 have different drive sources.

As described above, the driving directions of the coating robot 1000 and the power cylinder 207 are different.

Accordingly, space saving and cost reduction of the cleaning station 2000 can be realized.

As described above, at least one of the coating robot 1000 and the power cylinder 207 is connected to the driving mechanism using air.

Thus, it is possible to cope with various liquids such as a liquid containing a solvent.

As illustrated in FIG. 7, the first head 300A is made larger in size than the second head 300B. As the area of the nozzle face is larger, a larger force is needed for bringing the nozzle face into close contact with the sealer. Therefore, in the present embodiment, the driving source of the moving unit that presses the first head 300A having a large nozzle face area against the first sealer 205A is the coating robot 1000. By using the robot as the driving source requiring a larger force for the close contact, the pressing force needed for the driving source of the moving unit provided in the cleaning station 2000 is sufficient with a small force. Since the drive source of the moving unit provided in the cleaning station 2000 can be reduced in size, space saving and cost reduction of the cleaning station 2000 can be realized.

As described above, in the present embodiment, the coating system 3000 includes the coating robot 1000 that moves the head holder 101, and at least one of the first moving unit that relatively moves the first nozzle face 301A and the first sealer 205A and the second moving unit that relatively moves the second nozzle face 301B and the second sealer 205B is connected to the coating robot 1000.

As described above, the first nozzle face 301A has an area larger than the second nozzle face 301B, and the force needed for pressing the first sealer 205A against the first nozzle face 301A is larger than the force needed for pressing the second sealer 205B against the second nozzle face 301B.

As a result, the head requiring a larger force for close contact with the sealer (the first head 300A having a large nozzle face area in the present embodiment) can be pressed against the first sealer 205A with a large force of the coating robot 1000, and secure close contact can be performed.

In addition, in the order of pressing the two heads 300A and 300B against the sealers 205A and 205B, the first head 300A having a large nozzle face area is pressed against the first sealer 205A first. Bringing the first head 300A requiring a larger close contact force into close contact first enhances stability at the time of close contact between the two heads 300A and 300B.

If the second head 300B requiring a smaller close contact force is brought into close contact first, and then the first head 300A requiring a larger close contact force is brought into close contact, when the first head 300A is brought into close contact, the second head 300B having been brought into close contact earlier may succumb to the close contact force of the first head 300A to cause positional displacement. If the heads 300A and 300B and the sealers 205A and 205B are no longer in close contact state due to this positional displacement, there is a possibility that the cleaning liquid scatters to the surroundings. Therefore, in the order of close contact, the head requiring a larger close contact force is desirably brought into close contact first.

As described above, in the present embodiment, after the first sealing portion 206A is formed by the first nozzle face 301A and the first sealer 205A, the forming operation of the second sealing portion 206B by the second nozzle face 301B and the second sealer 205B is started.

As a result, in the operation of forming the sealing portion, the sealing portion can be reliably formed without causing positional displacement of the sealer with respect to the plurality of nozzle faces.

As described above, the head unit 100 of the coating system 3000 includes the head holder 101 that holds the first nozzle face 301A of the first head 300A and the second nozzle face 301B of the second head 300B. The coating system 3000 includes a robot arm as a moving unit that moves the head holder 101 of the head unit 100 with respect to the first sealer 205A and the second sealer 205B.

The robot arm integrally moves the first nozzle face 301A of the first head 300A and the second nozzle face 301B of the second head 300B held by the head holder 101. The robot arm also has a function of moving the head unit 100 with respect to the object 5000 such as a vehicle body to accurately arrange the first head 300A and the second head 300B in the head unit 100 at positions where to coat the object 5000.

The cleaning station 2000 includes the first sealer 205A and the second sealer 205B such that when the head holder 101 is moved by the robot arm, the first nozzle face 301A faces the first sealer 205A and the second nozzle face 301B faces the second sealer 205B.

With the configuration of the robot arm and the cleaning station 2000, the two heads oriented in different directions can be moved to positions facing the respective sealers 205A and 205B by one moving operation of the head holder 101, without separately moving the first nozzle face 301A of the first head 300A and the second nozzle face 301B of the second head 300B. After the first nozzle face 301A and the second nozzle face 301B are moved to the cleaning station 2000, the first nozzle face 301A and the second nozzle face 301B can be efficiently brought into close contact with each other. Further, providing the first cleaner for cleaning the first nozzle face 301A and the second cleaner for cleaning the second nozzle face 301B allows the two nozzle faces to be simultaneously cleaned.

Figure 12:
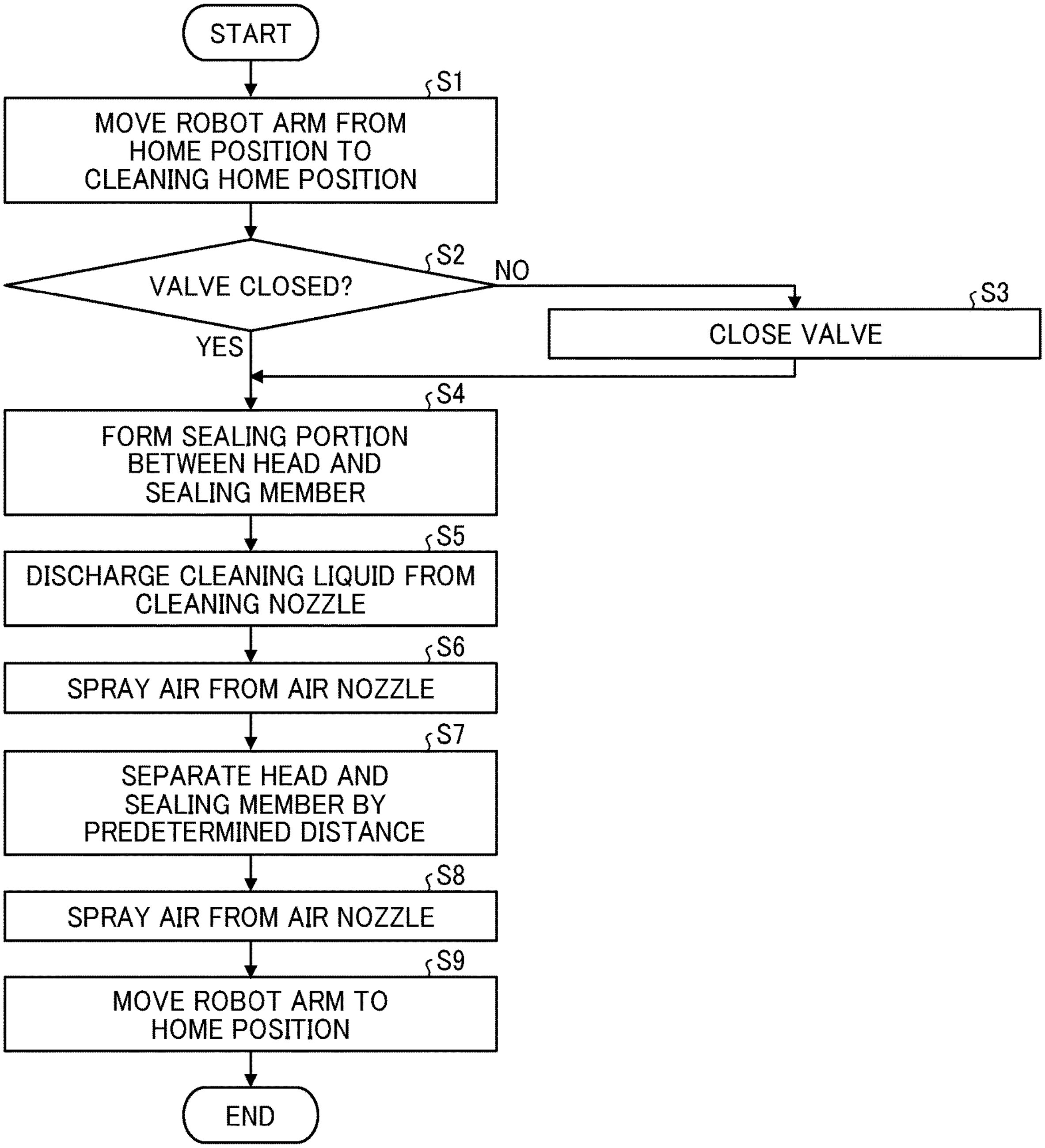
FIG. 12 is a flowchart illustrating an example of a cleaning operation.

Here, an example of a flow of a cleaning operation in the present embodiment will be described with reference to FIGS. 12 to 14. FIG. 12 is a flowchart illustrating an example of the cleaning operation.

When the cleaning operation on the heads 300A and 300B is started, the robot arm moves from the home position of the coating operation to the home position of the cleaning operation (step S1). When the robot arm reaches the cleaning home position, the robot controller 70 determines whether the valves 305 of the heads 300A and 300B are closed (whether the nozzles 302A and 302B are closed) (step S2). If the robot controller 70 determines in step S2 that the valves 305 are not closed (No), the valves 305 are closed, and the nozzles 302A and 302B are closed (step S3).

Once the valves 305 are closed, the heads 300A and 300B are brought into contact with the sealers 205A and 205B to form the sealing portions 206A and 206B between the heads 300A and 300B and the cleaning station 2000 (step S4). Once the sealing portions 206A and 206B are formed, the cleaning nozzles 201A and 201B installed in the sealing portions 206A and 206B discharge (spray) the cleaning liquid to clean the nozzle faces 301A and 301B (step S5).

The sealing portions 206A and 206B may include air nozzles for air injecting separately from the cleaning nozzles 201A and 201B. In this case, the air nozzles inject the air to the nozzle faces 301A and 301B to which the cleaning liquid adheres (step S6). Next, the heads 300A and 300B and the sealers 205A and 205B are separated from each other by a predetermined distance to eliminate the sealing portions 206A and 206B (step S7).

After eliminating the sealing portions 206A and 206B in step S7, the air nozzle injects the air again to the nozzle faces 301A and 301B (step S8). Performing the second air injection makes it possible to blow off to the outside of the nozzle faces 301A and 301B, foreign matter such as dirt pushed by the abutment portions between the nozzle faces 301A and 301B and the sealers 205A and 205B at the time of the first air injection. At the end of the second air injection, the robot arm moves to the home position, and the cleaning operation is completed (step S9).

Figure 13:
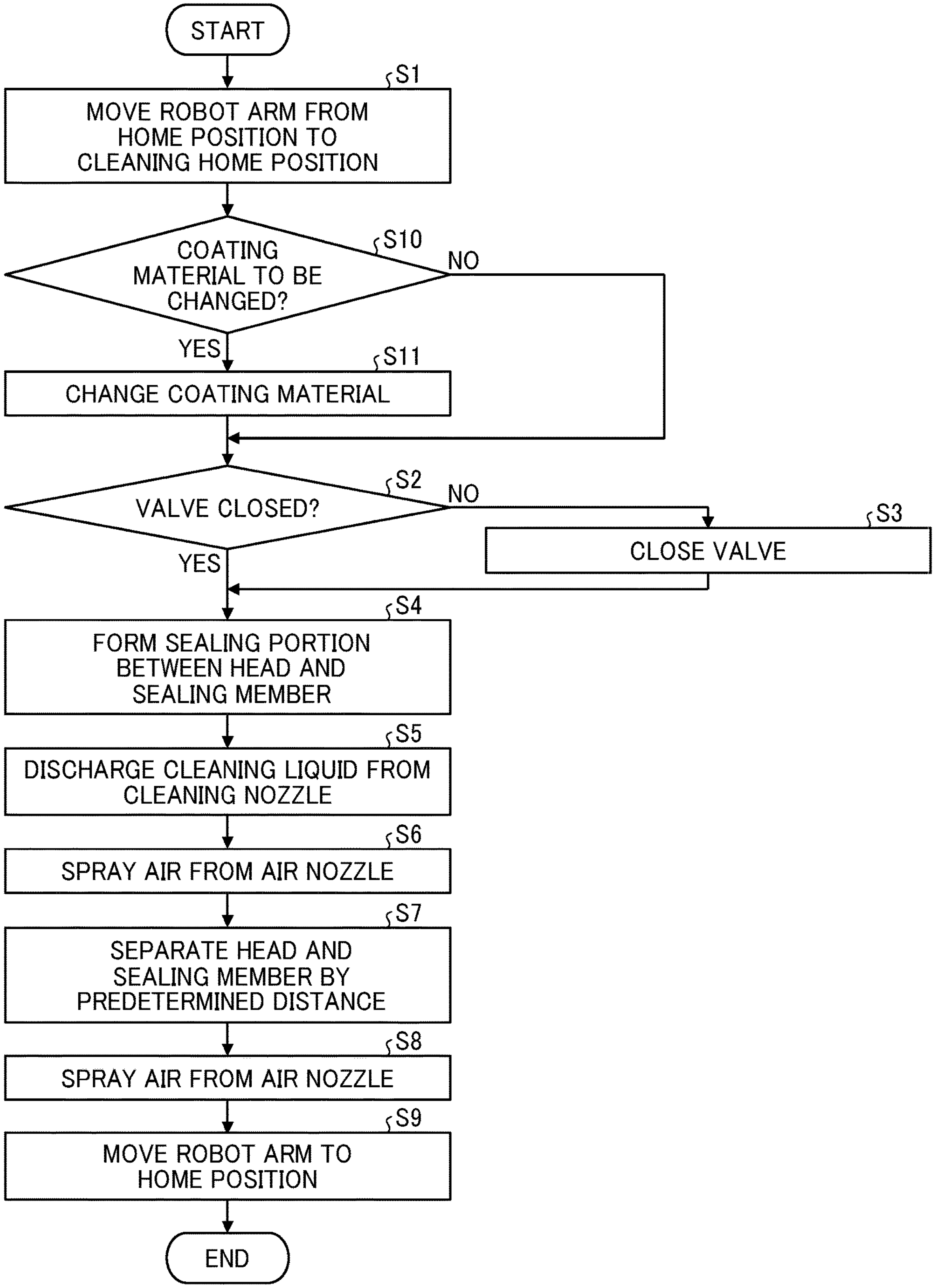
FIG. 13 is a flowchart illustrating an example of a cleaning operation.

FIG. 13 is a flowchart illustrating an example of another cleaning operation. The flowchart in FIG. 13 is different from the flowchart in FIG. 12 in that a coating change operation is added between step S1 and step S2. Therefore, the same processes or operations as those in the flow illustrated in FIG. 12 are denoted by the same reference numerals, and description thereof will be omitted.

In the case of the flow illustrated in FIG. 13, after step S1, the robot controller 70 determines whether to change the coating material to be used for coating (step S10). If the robot controller 70 determines in step S10 that the coating material is not to be changed (No), the process proceeds to step S2, and thereafter, processes or operations similar to those in the flow of FIG. 12 are executed. If the robot controller 70 determines in step S10 that the coating material is to be changed (Yes), the coating change operation is performed (step S11).

Figure 14:
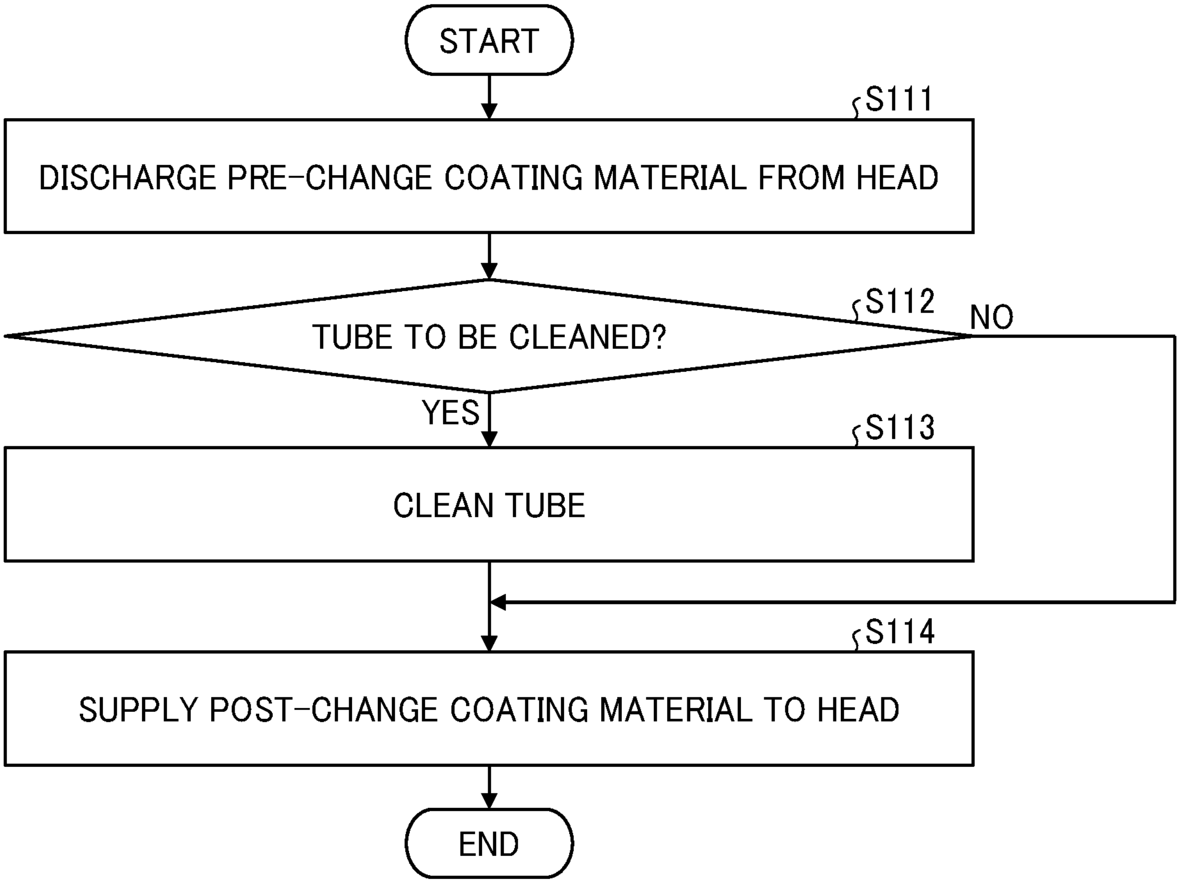
FIG. 14 is a flowchart illustrating an example of a coating change operation.

The coating change operation is performed on the basis of the flow illustrated in FIG. 14, for example. First, the robot controller 70 causes the heads 300A and 300B to discharge the coating material before the change (step S111). Then, the robot controller 70 determines whether to clean the tube that supplies the coating material to the heads 300A and 300B (step S112). If the robot controller 70 determines in step S112 that the tube is not to be cleaned (No), the coating material after the change is supplied to the heads 300A and 300B, and the coating change operation is completed (step S114). If the robot controller 70 determines in step S112 that the tube is to be cleaned (Yes), the tube is cleaned (step S113), and then step S114 is performed. Upon completion of the change operation of the coating material, the process proceeds to step S2, and thereafter, processes or operations similar to those in the flow of FIG. 12 are executed.

Modifications

Figure 9A:
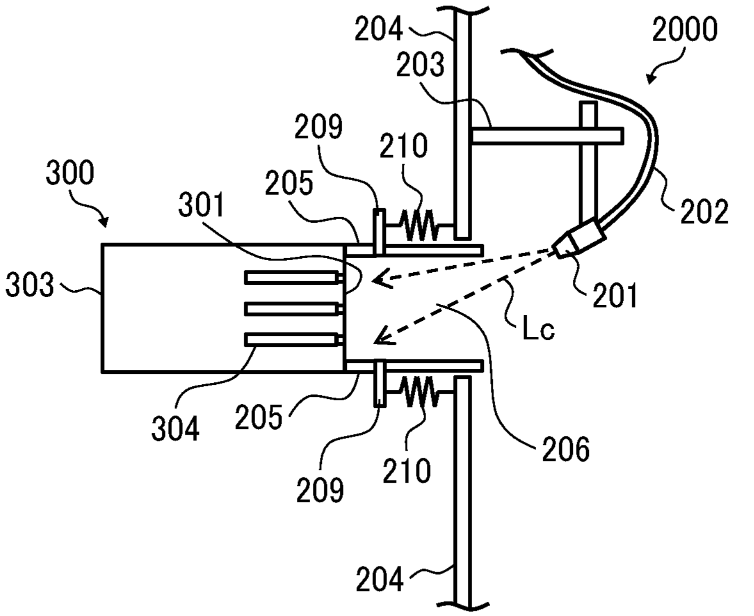
FIGS. 9A and 9B are explanatory diagrams illustrating a modification of the configuration of the cleaning station.
Figure 9B:
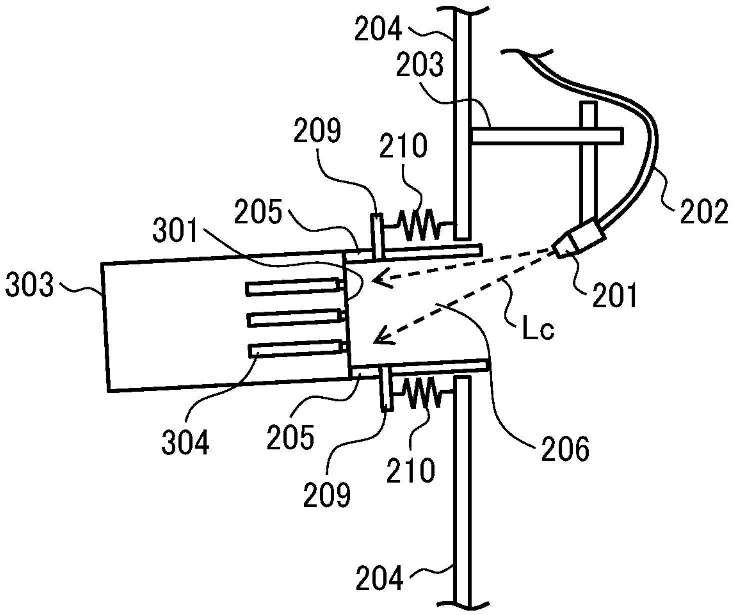

Next, a modification of the cleaning station will be described with reference to FIGS. 9A and 9B. FIGS. 9A and 9B are explanatory diagrams illustrating the modification of the configuration of the cleaning station.

In the configuration illustrated in FIG. 6, the sealer 205 is provided in the main body housing 204, whereas in the present modification, a sealer 205 is provided in a main body housing 204 via an elastic member 210.

In order to closely contact a nozzle face 301 in a reliable manner, it is desired to press the nozzle face 301 parallel to the sealer 205. However, there is a possibility that the nozzle face 301 is inclined with respect to the sealer 205 due to a movement error of a coating robot 1000 or the like. As described above, a first head 300A is brought into close contact by driving of the coating robot 1000, but a head 300B is brought into close contact by driving of a power cylinder 207 attached to the cleaning station 2000. Therefore, an attachment error of the power cylinder 207 may also be one of the factors that the nozzle face 301 is inclined with respect to the sealer 205.

In order to eliminate the inclination of the sealer 205 with respect to the nozzle face 301, the sealer 205 is preferably installed via the elastic member 210 as in the present modification. The sealer 205 is held by a sealer holder 209, and one end of the elastic member 210 such as a spring is hung on the sealer holder 209 holding the sealer 205. The other end of the elastic member 210 is hung on the main body housing 204.

With the above configuration, even if the nozzle face 301 is inclined with respect to the main body housing 204 as illustrated in FIG. 9B, the elastic member 210 absorbs the inclination at the stage of pressing the nozzle face 301 and the sealer 205, the posture of the sealer 205 is maintained in a state of being parallel to the nozzle face 301, and the close contact can be improved.

The present modification can be applied to both the case of close contact by the coating robot 1000 and the case of close contact by the power cylinder 207. Causing the sealer 205 to hold elastic force makes it possible to improve the close contact even if the posture of the head 300 is slightly inclined. The other end of the elastic member 210 may not be directly hung on the main body housing 204, but may be hung on a separate member such as a base plate provided separately from the main body housing 204.

Figure 10A:
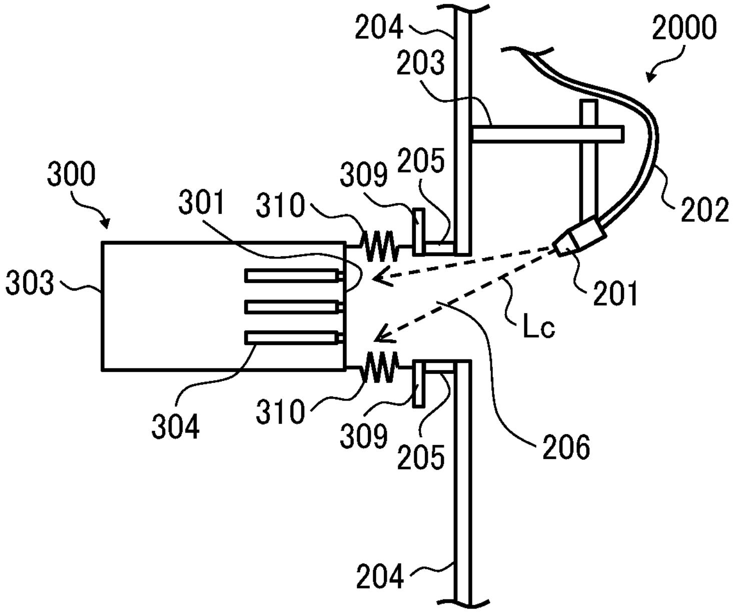
FIGS. 10A and 10B are explanatory diagrams illustrating a modification of the configuration of the cleaning station.
Figure 10B:
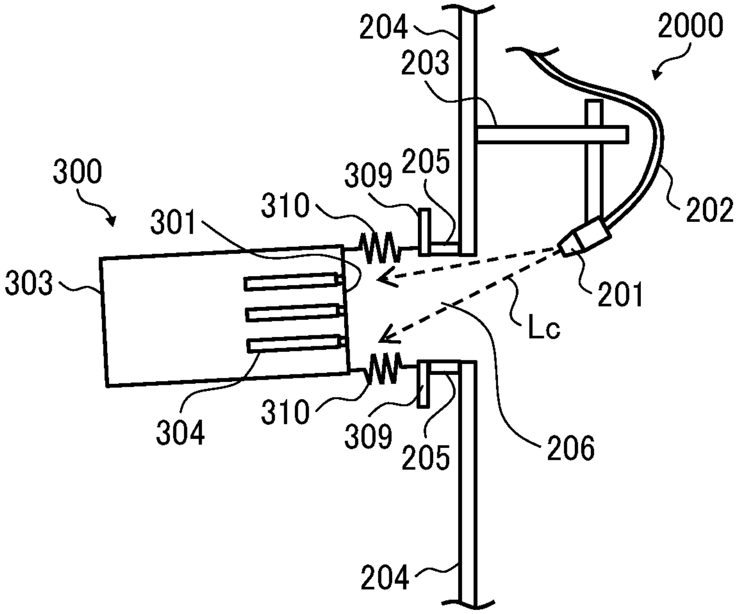

The elastic member 210 in the modification illustrated in FIGS. 9A and 9B may be provided as an elastic member 310 on a head 300 as illustrated in FIGS. 10A and 10B. In the modification illustrated in FIG. 10, in order to eliminate the inclination of a nozzle face 301 with respect to a sealer 205, a contact member 309 that contacts with (abuts on) the sealer 205 is installed on the head 300 via the elastic member 310. The sealer 205 is fixed to a main body housing 204.

With the above configuration, even if the nozzle face 301 is inclined with respect to the main body housing 204 as illustrated in FIG. 10B, the elastic member 310 absorbs the inclination at the stage of pressing the nozzle face 301 and the sealer 205, the posture of the contact member 309 is maintained in a state of being parallel to the sealer 205, and the close contact can be improved.

As described above, in the present embodiment, at least one of the first sealer 205A and the second sealer 205B is supported so as to be changeable according to the inclination of the nozzle face 301 pressed against the sealer.

In addition, as described above, at least one of the first sealer 205A and the second sealer 205B is supported so as to follow the inclination of the nozzle face 301 pressed by the sealer.

As a result, even if the nozzle face 301 is inclined with respect to the main body housing 204, the posture of the sealer 205 can be held in parallel to the nozzle face 301, and the close contact can be enhanced.

In the configuration of the present modification, if the coating robot 1000 or the power cylinder 207 is driven at a constant speed while keeping a high speed and the head 300 is pressed against the sealer 205 and suddenly stopped, vibration may be generated in the sealer 205 by the action of the elastic member 210. If the sealer 205 vibrates, the force of close contact between the nozzle face 301 and the sealer 205 becomes weak. Thus, performing the cleaning process in this state may cause the cleaning liquid to scatter outside the cleaning station 2000. In addition, the sealer 205 may not stop at an appropriate position with respect to the nozzle face 301, so that the nozzle face 301 may not be appropriately cleaned.

Therefore, the speed of the pressing operation of the coating robot 1000 or the power cylinder 207 may be variably set. For example, gradually decreasing the speed of the pressing operation of the coating robot 1000 or the power cylinder 207 as the nozzle face 301 approaches the sealer 205 makes it possible to suppress the vibration of the sealer 205 caused by the elastic member 210. Gradually slowing down the coating robot 1000 and the power cylinder 207 as the nozzle face 301 approaches the sealer 205, pressing the nozzle face 301 and the sealer 205 at a speed at which the elastic member 210 does not vibrate, and then stopping the head 300 reliably brings the nozzle face 301 and the sealer 205 into close contact with each other at appropriate positions.

As described above, in the present embodiment, the speed of the moving operation by the coating robot 1000 and the power cylinder 207 can be variably set.

As described above, the speed of the moving operation by the coating robot 1000 and the power cylinder 207 decreases as the first nozzle face 301A and the second nozzle face 301B approach the first sealer 205A and the second sealer 205B.

As a result, the vibration of the sealer 205 caused by the elastic member 210 is suppressed, and the nozzle faces 301A and 301B and the sealers 205A and 205B can reliably come into close contact with each other at appropriate positions.

Supplements

In the present embodiment, the liquid may be a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. The liquid may contain fine powder such as metal powder. These can be used for, for example, inkjet ink, coating material, surface treatment liquid, constituent elements of electronic elements and light emitting elements, liquid for forming electronic circuit resist patterns, material liquid for three-dimensional modeling, and the like.

The above description is an example, and the present embodiment has unique advantageous effects for each of the following aspects.

A first aspect includes: a first nozzle face (for example, the first nozzle face 301A) on which a nozzle discharging a liquid is formed; a first head (for example, the first head 300A) having the first nozzle face; a second nozzle face (for example, the second nozzle face 301B) on which a nozzle discharging liquid is formed and which is oriented in a direction different from the first nozzle face; a second head (for example, the second head 300B) having the second nozzle face; a head holder (for example, the head holder 101) including the first head and the second head; a first sealer (for example, the first sealer 205A) that forms a first sealing portion (for example, the first sealing portion 206A) with respect to the first nozzle face; a second sealer (for example, the second sealer 205B) that forms a second sealing portion (for example, the second sealing portion 206B) with respect to the second nozzle face; a first cleaner (for example, the cleaning nozzle 201A) that cleans the first nozzle face with the first sealing portion formed; and a second cleaner (for example, the cleaning nozzle 201B) that cleans the second nozzle face with the second sealing portion formed.

According to the first aspect, it is possible to provide a liquid discharge system that improves productivity in cleaning of a plurality of heads in different directions.

A second aspect is characterized by including, in the first aspect, a first moving unit (for example, the coating robot 1000) that relatively moves the first nozzle face (for example, the first nozzle face 301A) and the first sealer (for example, the first sealer 205A), and a second moving unit (for example, the power cylinder 207) that relatively moves the second nozzle face (for example, the second nozzle face 301B) and the second sealer (for example, the second sealer 205B).

A third aspect is characterized in that, in the second aspect, the first moving unit (for example, the coating robot 1000) and the second moving unit (for example, the power cylinder 207) have different drive sources.

A fourth aspect is characterized in that, in the second aspect or the third aspect, driving directions of the first moving unit (for example, the coating robot 1000) and the second moving unit (for example, the power cylinder 207) are different.

According to the second to fourth aspects, space saving and cost reduction of the cleaning station can be realized.

A fifth aspect is characterized in that, in any one of the second to fourth aspects, at least one of the first moving unit (for example, the coating robot 1000) and the second moving unit (for example, the power cylinder 207) is connected to a driving mechanism using air.

According to the fifth aspect, it is possible to cope with various liquids such as a liquid containing a solvent.

A sixth aspect is characterized in that, in any one of the second to fifth aspects, the liquid discharge system (for example, the coating system 3000) includes a robot (for example, the coating robot 1000) that moves the head holder (for example, the head holder 101), and at least one moving unit of the first moving unit and the second moving unit is connected to the robot.

A seventh aspect is characterized in that, in any one of the second to sixth aspects, the first nozzle face (for example, the first nozzle face 301A) has an area larger than the second nozzle face (for example, the second nozzle face 301B), and a force needed for pressing the first sealer (for example, the first sealer 205A) against the first nozzle face is larger than a force needed for pressing the second sealer (for example, the second sealer 205B) against the second nozzle face.

According to the sixth and seventh aspects, it is possible to reliably seal the head that requires a large force when the head is brought into close contact with the sealer.

An eighth aspect is characterized in that, in the seventh aspect, after a first sealing portion (for example, the first sealing portion 206A) is formed by the first nozzle face (for example, the first nozzle face 301A) and the first sealer (for example, the first sealer 205A), an operation of forming a second sealing portion (for example, the second sealing portion 206B) between the second nozzle face (for example, the second nozzle face 301B) and the second sealer (for example, the second sealer 205B) is started.

According to the eighth aspect, in the operation of forming the sealing portion, the sealing portion can be reliably formed without causing positional displacement of the sealer with respect to the plurality of nozzle faces.

A ninth aspect is characterized in that, in any one of the first to eighth aspects, at least one of the first sealer (for example, the first sealer 205A) and the second sealer (for example, the second sealer 205B) is supported so as to be changeable according to an inclination of the nozzle face pressed by the sealer.

A tenth aspect is characterized in that, in any one of the first to eighth aspects, at least one of the first sealer (for example, the first sealer 205A) and the second sealer (for example, the second sealer 205B) is supported so as to follow an inclination of the nozzle face pressed by the sealer.

According to the ninth and tenth aspects, even if the nozzle face is inclined with respect to the main body housing, the posture of the sealer can be held in parallel to the nozzle face, and the close contact can be enhanced.

An eleventh aspect is characterized in that, in any one of the second to tenth aspects, the speed of the moving operation by the first moving unit (for example, the coating robot 1000) and the second moving unit (for example, the power cylinder 207) can be variably set.

A twelfth aspect is characterized in that, in the eleventh aspect, the speed of the moving operation by the first moving unit (for example, the coating robot 1000) and the second moving unit (for example, the power cylinder 207) decreases as the first nozzle face (for example, the first nozzle face 301A) and the second nozzle face (for example, the second nozzle face 301B) approach the first sealer (for example, the first sealer 205A) and the second sealer (for example, the second sealer 205B).

According to the eleventh and twelfth aspects, the vibration of the sealers at the time of the pressing operation is suppressed, and the nozzle faces and the sealers can be reliably brought into close contact with each other at appropriate positions.

Aspect 13

A liquid discharge system includes: a first head having a first nozzle, from which a liquid is to be discharged, on a first nozzle face oriented in a first direction; a second head having a second nozzle, from which a liquid is to be discharged, on a second nozzle face oriented in a second direction different from the first direction; a head holder holding the first head and the second head; a first sealer configured to contact and seal the first nozzle face; a second sealer configured to contact and seal the second nozzle face; a first cleaner configured to clean the first nozzle face in a state where the first sealer has contacted and sealed the first nozzle face; and a second cleaner configured to clean the second nozzle face in a state where the second sealer has contacted and sealed the second nozzle face.

Aspect 14

The liquid discharge system according to aspect 13, further includes: a first moving unit configured to relatively move the first nozzle face and the first sealer; and a second moving unit configured to relatively move the second nozzle face and the second sealer.

Aspect 15

In the liquid discharge system according to aspect 14, the first moving unit includes a first drive source, and the second moving unit includes a second drive source different from the first drive source.

Aspect 16

In the liquid discharge system according to aspect 14 or 15, the first moving unit relatively move the first nozzle face and the first sealer in a first direction; and the second moving unit relatively move the second nozzle face and the second sealer in a second direction different from the first direction.

Aspect 17

The liquid discharge system according to any one of aspects 14 to 16, further includes: a driver driven by air; and the driver is coupled to at least one of the first moving unit or the second moving unit.

Aspect 18

The liquid discharge system according to any one of aspects 14 to 17, further includes: a robot configured to move the head holder, wherein the robot is coupled to at least one of the first moving unit or the second moving unit.

Aspect 19

In the liquid discharge system according to any one of aspects 14 to 18, the first nozzle face has a first area; and the second nozzle face has a second area smaller than the first area, and the first sealer is pressed against the first nozzle face with a first force; and the second sealer is pressed against the second nozzle face with a second force smaller than the first force.

Aspect 20

In the liquid discharge system according to aspect 19, the second sealer starts contacting and sealing the second nozzle face after the first sealer has contacted and sealed the first nozzle face.

Aspect 21

In the liquid discharge system according to any one of aspects 13 to 20, the first sealer includes an elastic member configured to change an inclination of the first sealer according to an inclination of the first nozzle face.

Aspect 22

In the liquid discharge system according to any one of aspects 12 to 21, the second sealer includes an elastic member configured to change an inclination of the second sealer according to an inclination of the second nozzle face.

Aspect 23

In the liquid discharge system according to any one of aspects 13 to 22, the first head includes:

an elastic member; and a first contact member coupled to the elastic member, the first contact member configured to contact the first sealer.

Aspect 24

In the liquid discharge system according to any one of aspects 12 to 23, the second head includes: an elastic member; and a second contact member coupled to the elastic member, the second contact member configured to contact the second sealer.

Aspect 25

In the liquid discharge system according to any one of aspects 14 to 24, a moving speed of each of the first moving unit and the second moving unit is variable.

Aspect 26

In the liquid discharge system according to aspect 25, the moving speed of the first moving unit decreases as the first nozzle face approaches the first sealer.

Aspect 27

In the liquid discharge system according to aspect 25, the moving speed of the second moving unit decreases as the second nozzle face approaches the second sealer.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

REFERENCE SIGNS LIST

3000 Coating system
1000 Coating robot
100 Head unit
300 Head
301, 301A, 301B Nozzle face
302, 302A, 302B Nozzle
2000 Cleaning station
201, 201A, 201B Cleaning nozzle
205, 205A, 205B Sealer
206, 206A, 206B Sealing portion
5000 Object

The invention claimed is:

1. A liquid discharge system comprising:

a first head including a first nozzle, from which a liquid is to be discharged, on a first nozzle face oriented in a first direction;

a second head including a second nozzle, from which a liquid is to be discharged, on a second nozzle face oriented in a second direction different from the first direction;

a head holder holding the first head and the second head;

a first sealer to contact and seal the first nozzle face;

a second sealer to contact and seal the second nozzle face;

a first cleaner to clean the first nozzle face in a state where the first sealer has contacted and sealed the first nozzle face;

a second cleaner to clean the second nozzle face in a state where the second sealer has contacted and sealed the second nozzle face;

a first mover to relatively move the first nozzle face and the first sealer;

a second mover to relatively move the second nozzle face and the second sealer;

a robot to move the head holder; and processing circuitry, wherein:

the robot is coupled to at least one of the first mover or the second mover, the first nozzle face has a first area;

the second nozzle face has a second area smaller than the first area; and the processing circuitry is configured to:

control the first sealer to press against the first nozzle face with a first force, and control the second sealer to press against the second nozzle face with a second force smaller than the first force.

2. The liquid discharge system according to claim 1 wherein:

the first mover includes a first drive source, and the second mover includes a second drive source different from the first drive source.

3. The liquid discharge system according to claim 1, wherein the processing circuitry is configured to:

control the first mover to relatively move the first nozzle face and the first sealer in the first direction; and control the second mover to relatively move the second nozzle face and the second sealer in the second direction different from the first direction.

4. The liquid discharge system according to claim 1, further comprising:

a driver driven by air, wherein the driver is coupled to at least one of the first mover or the second mover.

5. The liquid discharge system according to claim 1, wherein the processing circuitry is configured to:

control the second sealer to start contacting and sealing the second nozzle face after the first sealer has contacted and sealed the first nozzle face.

6. The liquid discharge system according to claim 1, wherein the first sealer includes an elastic to change an inclination of the first sealer according to an inclination of the first nozzle face.

7. The liquid discharge system according to claim 1, wherein the second sealer includes an elastic to change an inclination of the second sealer according to an inclination of the second nozzle face.

8. The liquid discharge system according to claim 1, wherein the first head includes:

an elastic; and a first contact coupled to the elastic, the first contact to contact the first sealer.

9. The liquid discharge system according to claim 1, wherein the second head includes:

an elastic; and a second contact coupled to the elastic, the second contact to contact the second sealer.

10. The liquid discharge system according to claim 1, wherein:

a moving speed of each of the first mover and the second mover is variable.

11. The liquid discharge system according to claim 10, wherein the processing circuitry is configured to:

control the moving speed of the first mover to decrease as the first nozzle face approaches the first sealer.

12. The liquid discharge system according to claim 10, wherein the processing circuitry is configured to:

control the moving speed of the second mover to decrease as the second nozzle face approaches the second sealer.

13. A liquid discharge system comprising:

a first head including a first nozzle, from which a liquid is to be discharged, on a first nozzle face oriented in a first direction;

a second head including a second nozzle, from which a liquid is to be discharged, on a second nozzle face oriented in a second direction different from the first direction;

a head holder holding the first head and the second head;

a first sealer to contact and seal the first nozzle face;

a second sealer to contact and seal the second nozzle face;

a first cleaner to clean the first nozzle face in a state where the first sealer has contacted and sealed the first nozzle face;

a second cleaner to clean the second nozzle face in a state where the second sealer has contacted and sealed the second nozzle face;

a first mover to relatively move the first nozzle face and the first sealer;

a second mover to relatively move the second nozzle face and the second sealer; and processing circuitry, wherein:

the first nozzle face has a first area;

the second nozzle face has a second area smaller than the first area; and the processing circuitry is configured to:

control the first sealer to press against the first nozzle face with a first force, control the second sealer to press against the second nozzle face with a second force smaller than the first force, and control the second sealer to start contacting and sealing the second nozzle face after the first sealer has contacted and sealed the first nozzle face.

14. The liquid discharge system according to claim 13, wherein:

the first mover includes a first drive source, and the second mover includes a second drive source different from the first drive source.

15. The liquid discharge system according to claim 13, wherein the processing circuitry is configured to:

control the first mover to relatively move the first nozzle face and the first sealer in the first direction; and control the second mover to relatively move the second nozzle face and the second sealer in the second direction different from the first direction.

16. The liquid discharge system according to claim 13, further comprising:

a driver driven by air, wherein the driver is coupled to at least one of the first mover or the second mover.

17. The liquid discharge system according to claim 13, wherein:

the first sealer includes an elastic to change an inclination of the first sealer according to an inclination of the first nozzle face.

18. The liquid discharge system according to claim 13, wherein:

the second sealer includes an elastic to change an inclination of the second sealer according to an inclination of the second nozzle face.

19. The liquid discharge system according to claim 13, wherein:

a moving speed of each of the first mover and the second mover is variable, and the processing circuitry is configured to control the moving speed of the first mover to decrease as the first nozzle face approaches the first sealer.

20. The liquid discharge system according to claim 19, wherein the processing circuitry is configured to:

control the moving speed of the second mover to decrease as the second nozzle face approaches the second sealer.

* * * * *